(12) United States Patent
Kim et al.

(10) Patent No.: US 11,258,838 B2
(45) Date of Patent: Feb. 22, 2022

(54) METHOD, SYSTEM, AND NON-TRANSITORY COMPUTER READABLE RECORD MEDIUM FOR PROCESSING CHATROOM BASED ON USAGE

(71) Applicant: LINE Plus Corporation, Seongnam-si (KR)

(72) Inventors: Donghyun Kim, Seongnam-si (KR); Hyukjae Jang, Seongnam-si (KR); Hey Young Yun, Seongnam-si (KR); Jong Youn Ahn, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/119,127

(22) Filed: Dec. 11, 2020

(65) Prior Publication Data

US 2021/0099503 A1 Apr. 1, 2021

Related U.S. Application Data

(63) Continuation of application No. PCT/KR2018/006629, filed on Jun. 12, 2018.

(51) Int. Cl.
*G06F 15/16* (2006.01)
*H04L 65/403* (2022.01)
*G06F 16/2457* (2019.01)
*H04L 67/50* (2022.01)

(52) U.S. Cl.
CPC ...... *H04L 65/403* (2013.01); *G06F 16/24578* (2019.01); *H04L 67/22* (2013.01)

(58) Field of Classification Search
CPC ....... H04L 51/16; H04L 51/32; H04L 67/306; H04L 65/403; H04L 67/22
USPC ........................................................ 709/204
See application file for complete search history.

(56) References Cited

U.S. PATENT DOCUMENTS

2014/0236953 A1* 8/2014 Rapaport ............... G06Q 10/10
707/740

FOREIGN PATENT DOCUMENTS

| JP | 6328180 B2 | 5/2018 |
| KR | 10-2002-0074304 A | 9/2002 |
| KR | 10-1586688 B1 | 1/2016 |
| KR | 10-2016-0018109 A | 2/2016 |
| KR | 10-2016-0035197 A | 3/2016 |
| KR | 10-1631287 B1 | 6/2016 |

OTHER PUBLICATIONS

International Search Report dated Mar. 12, 2019 issued in International Application No. PCT/KR2018/006629.

* cited by examiner

*Primary Examiner* — Wing F Chan
*Assistant Examiner* — Andrew Woo
(74) *Attorney, Agent, or Firm* — Harness, Dickey & Pierce, P.L.C.

(57) ABSTRACT

Disclosed are methods, systems, and non-transitory computer-readable record mediums for processing a chatroom based on a level of use. A chatroom processing method including verifying a level of use by a user with respect to each chatroom of chatrooms included in a chatroom list, selecting at least one chatroom from the chatroom list as a chatroom to be managed based on the level of use, and processing the chatroom to be managed to be distinguished from remaining chatrooms in the chatroom list may be provided.

16 Claims, 9 Drawing Sheets

| Factor | (a) Number of entrances into chatroom |
| --- | --- |
| | (b) Residence time |
| | (c) Conversation ratio |
| | (d) Conversation start count |
| | (e) Number of mentions |

METHOD, SYSTEM, AND NON-TRANSITORY COMPUTER READABLE RECORD MEDIUM FOR PROCESSING CHATROOM BASED ON USAGE

CROSS-REFERENCE TO RELATED APPLICATIONS

This U.S. non-provisional application is a continuation of and claims the benefit of priority under 35 U.S.C. § 365(c) to International Application PCT/KR2018/006629, which has an International filing date of Jun. 12, 2018, the entire contents of which are incorporated herein by reference in their entirety.

BACKGROUND

Technical Field

One or more example embodiments relate to technology for managing a chatroom.

Related Art

An instant messenger that is a general communication tool refers to software capable of sending and receiving messages or data in real time. A user may register a contact on a messenger and may exchange messages with a counterpart included in a contact list in real time. Such a messenger function is popular in a mobile environment of a mobile communication terminal as well as a personal computer (PC).

SUMMARY

Some example embodiments may manage a chatroom based on a level of use of the chatroom.

Some example embodiments may determine a level of use for each chatroom and may process a chatroom of which the level of use is less than or equal to a desired level to be distinguished from remaining chatrooms.

According to an example embodiment, there is provided a chatroom processing method implemented by a computer system including at least one processor configured to execute computer-readable instructions included in a memory, the method including, by the at least one processor, verifying a level of use by a user with respect to each chatroom of chatrooms included in a chatroom list, selecting at least one chatroom from the chatroom list as a chatroom to be managed based on the level of use, and processing the chatroom to be managed to be distinguished from remaining chatrooms in the chatroom list.

The verifying may include verifying the level of use by verifying a use pattern according to a participation of the user into a conversation for each chatroom and by converting a usage of a corresponding chatroom by the user to a score based on the use pattern.

The verifying may include verifying the level of use by calculating at least one factor from among a number of entrances, a residence time, a conversation ratio, a conversation start count, or a number of mentions in association with the user for each chatroom.

The selecting may include selecting the at least one chatroom of which the level of use is less than or equal to a desired level as the chatroom to be managed.

The selecting may include determining a ranking of each chatroom based on the level of use, and selecting the at least one chatroom of a desired ranking or less or the at least one chatroom, which includes a desired number of chatrooms from the lowest, as the chatroom to be managed.

The selecting may include assigning a rating to each chatroom based on the level of use and selecting the at least one chatroom to which a desired rating or less is assigned as the chatroom to be managed.

The chatroom processing method may further include determining a criterion for selecting the at least one chatroom as the chatroom to be managed differently, based on a messenger use time for the user.

The processing may include processing a notification interval of the chatroom to be managed to be longer than those of the remaining chatrooms.

The processing may include inactivating a notification function of the chatroom to be managed.

The processing may include processing the chatroom to be managed to be deleted or hidden from the chatroom list.

The processing may include processing an account of the user associated with the chatroom list to be locked in response to the selecting an entirety of the chatrooms included in the chatroom list, as the chatroom to be managed.

According to an example embodiment, there is provided a non-transitory computer-readable record medium storing instructions thereon, when executed by at least one processor, cause a computer system to implement the chatroom processing method.

According to an example embodiment, there is provided a computer system including a memory and at least one processor configured to connect to the memory and to execute computer-readable instructions included in the memory. The at least one processor is configured to verify a level of use by a user with respect to each chatroom of chatrooms included in a chatroom list, to select at least one chatroom from the chatroom list as a chatroom to be managed based on the level of use, and process the chatroom to be managed to be distinguished from remaining chatrooms in the chatroom list.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings.

Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of the disclosed example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for managing a chatroom, and more particularly, to technology for processing a chatroom based on a level of use.

The example embodiments including the disclosures described herein may manage a chatroom based on a level of use of the chatroom, and may achieve many advantages in terms of convenience, efficiency, resource saving, and cost saving.

Figure 1:
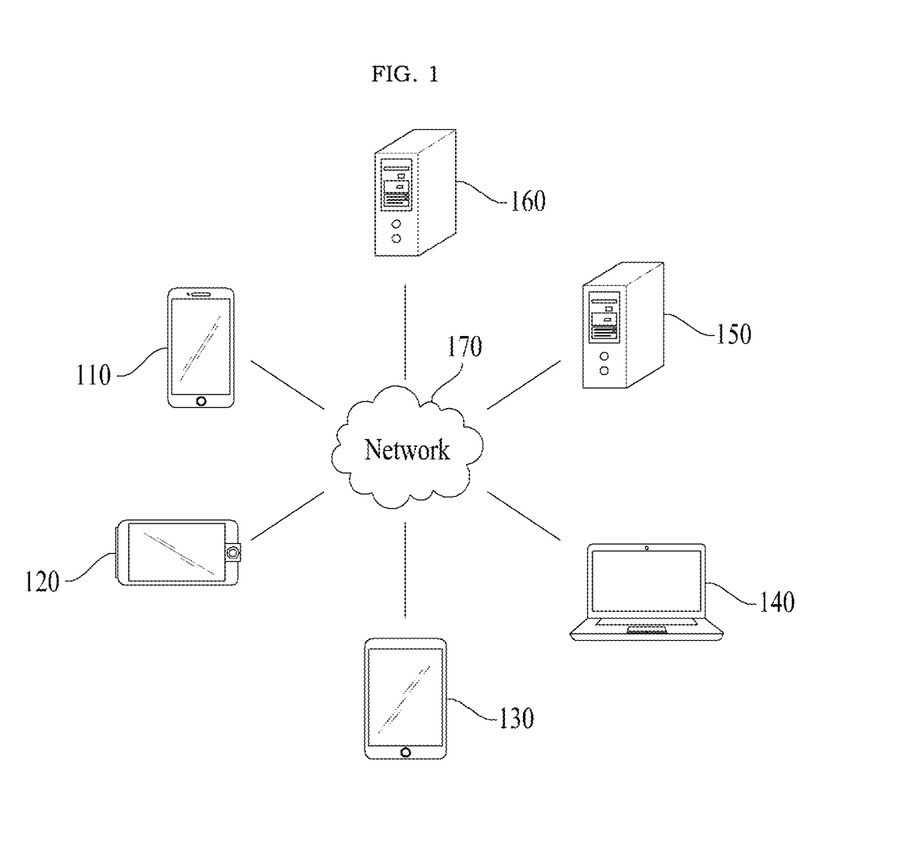
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a short-range wireless communication scheme between devices as well as a communication scheme using a communication network (e.g., a mobile communication network, wired Internet, wireless Internet, a broadcasting network, or a satellite network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Further, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provide(s) an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. For example, the server 150 may provide a service (e.g., a social network service (SNS)) intended by an application through the application as a computer program installed and executed on the plurality of electronic devices 110, 120, 130, and 140, as the first service. As another example, the server 160 may provide a service that distributes a file for installing and executing the application to the plurality of electronic devices 110, 120, 130, and 140, as the second service.

Figure 2:
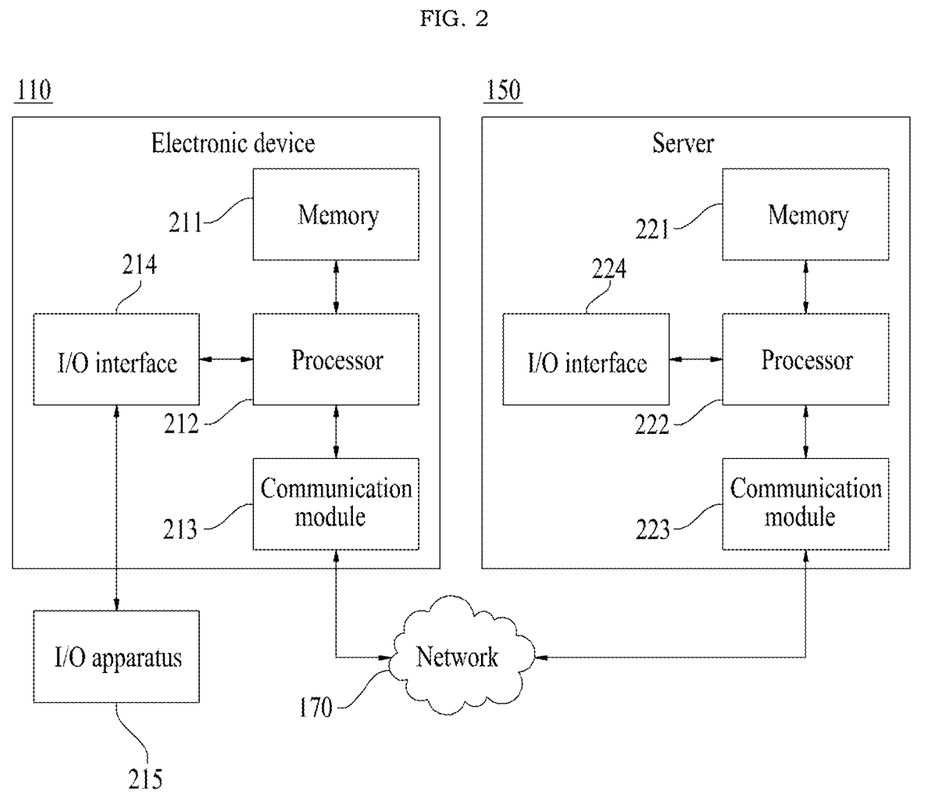
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), or a flash memory, as a non-transitory computer-readable record medium. The permanent mass storage device such as ROM, SSD, flash memory, or disk drive, may be included in the electronic device 110 or the server 150 as a permanent storage device separate from the memory 211, 221. Further, an OS and at least one program code (e.g., a code for a browser installed and executed on the electronic device 110 or an application installed and executed on the electronic device 110 to provide a specific service) may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, or a memory card. According to other example embodiments, software components may be loaded to the memory 211, 221 through the communication module 213, 223, instead of the non-transitory computer-readable record medium. For example, at least one program may be loaded to the memory 211, 221 based on a computer program (e.g., the application) installed by files provided over the network 170 from developers or a file distribution system (e.g., the server 160) providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device (e.g., the electronic device 120) or another server (e.g., the server 160). For example, the processor 212 of the electronic device 110 may transfer a request created based on a program code stored in the storage device such as the memory 211, to the server 150 over the network 170 under control of the communication module 213. Inversely, a control signal, an instruction, content, a file, etc. provided under control of the processor 222 of the server 150 may be received at the electronic device 110 through the communication module 213 of the electronic device 110 by going through the communication module 223 and the network 170. For example, a control signal, an instruction, content, a file, etc. of the server 150 received through the communication module 213 may be transferred to the processor 212 or the memory 211, and content, a file, etc. may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, or a camera, and an output device may include a device, such as a display, a speaker, or a haptic feedback device. As another example, the I/O interface 214 may be a device for interface with an apparatus in which an input function and an output function are integrated into a single function, such as a touchscreen. The I/O apparatus 215 may be configured as a single device with the electronic device 110. Further, the I/O interface 224 of the server 150 may be a device for interface with an apparatus (not shown) for input or output that may be connected to the server 150 or included in the server 150. For example, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a number of components less than or greater than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, and/or a database (DB). For example, if the electronic device 110 is a smartphone, the electronic device 110 may be configured to further include a variety of components, for example, an acceleration sensor, a gyro sensor, a camera module, various physical buttons, a button using a touch panel, an I/O port, and/or a vibrator for vibration, which are generally included in the smartphone.

Hereinafter, methods and systems for processing a chatroom based on a level of use according to some example embodiments is described.

Herein, the term "chatroom" used herein may refer to an interface screen for providing messages exchanged between users, such as, for example, an interface screen for displaying messages exchanged through a communication session established between accounts of users on a messenger or a social network service (SNS) and an interface screen for displaying messages exchanged with a counterpart of a corresponding telephone number based on the telephone number in, for example, a short message service (SMS) or a multimedia message service (MMS).

Although the following description is made based a chatroom of a messenger as an example, it is provided as an example only. Any chat-based interfaces created based on an account or a telephone number of a user may apply.

Figure 3:
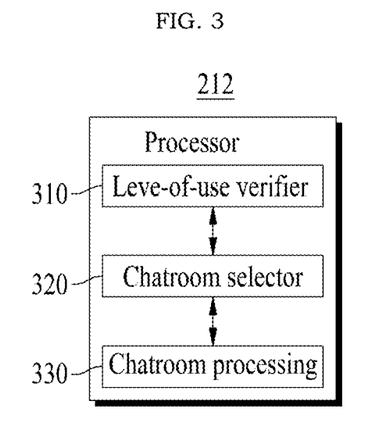
FIG. 3 is a diagram illustrating an example of components includable in a processor of an electronic device according to at least one example embodiment.
Figure 4:
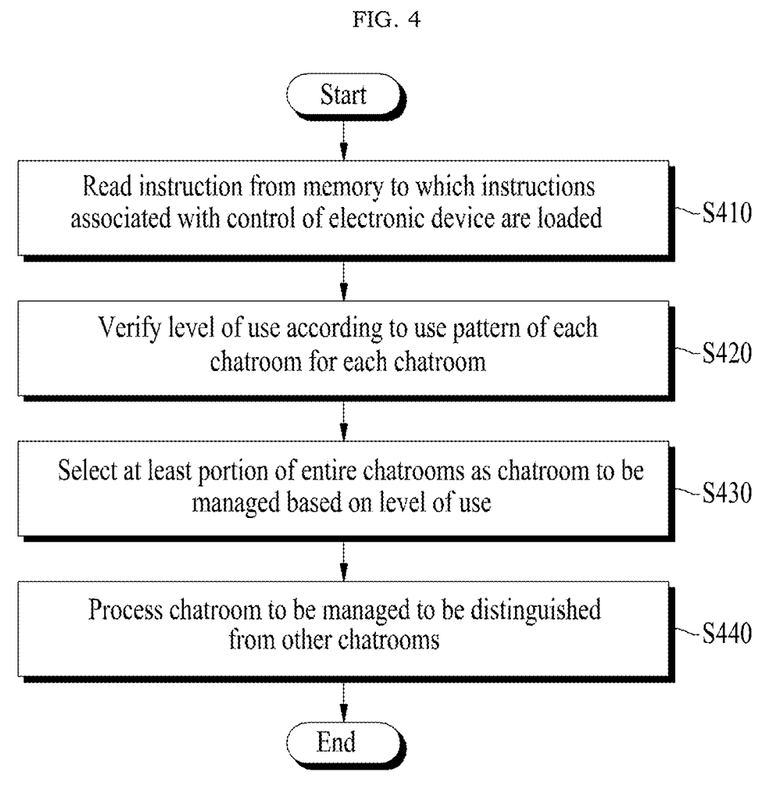
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A chatroom processing system implemented as a computer may be configured in the electronic device 110 according to the example embodiment. For example, the chatroom processing system may be configured in a form of a program that independently operates, or may be configured in an in-app form of a specific application to be operable on the specific application. Depending on some example embodiments, the chatroom processing system may provide a messenger service, through interaction with the server 150.

In response to an instruction provided from an application installed on the electronic device 110, the chatroom processing system configured in the electronic device 110 may perform a chatroom processing method of FIG. 4.

Referring to FIG. 3, to perform the chatroom processing method of FIG. 4, the processor 212 of the electronic device 110 may include a level-of-use verifier 310, a chatroom selector 320, and a chatroom processing 330. Depending on some example embodiments, components of the processor 212 may be included in or excluded from the processor 212. Further, depending on some example embodiments, components of the processor 212 may be separated or merged for functional representation of the processor 212.

The processor 212 and the components of the processor 212 may control the electronic device 110 to perform operations S410 to S440 included in the chatroom processing method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction (e.g., an instruction provided from an application executed on the electronic device 110) provided from a program code stored in the electronic device 110. For example, the level-of-use verifier 310 may be used as a functional representation of the processor 212 to control the electronic device 110 to verify a level of use of a corresponding chatroom in response to the instruction.

Referring to FIG. 4, in operation S410, the processor 212 may read a desired instruction from the memory 211 to which instructions associated with control of the electronic device 110 are loaded. In this case, the read instruction may include an instruction for controlling the processor 212 to perform the following operations S420 to S440.

In operation S420, the level-of-use verifier 310 may verify a level of use according to a use pattern of each chatroom for each of chatrooms included in a chatroom list of a messenger. Here, the level-of-use verifier 310 may verify the use pattern according to the user's participation into a conversation for each chatroom based on conversation content stored in a storage space (e.g., the memory 211) associated with the messenger every preset (or alternatively, desired) period (e.g., every day or every week), and may also verify the use pattern by converting a usage of a corresponding chatroom (e.g., how much or how often the user uses the chatroom) to a score.

Figure 5:
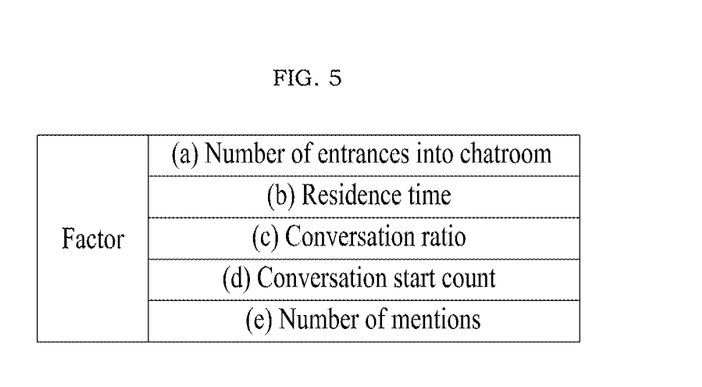
FIG. 5 illustrates examples of an element available to verify a level of use of a chatroom according to at least one example embodiment.

FIG. 5 illustrates examples of factors that may be used to verify a level of use of a chatroom. An example of the level of use relates to (a) how often the user enters a corresponding chatroom, which may be calculated as a number of entrances into the chatroom. Another example of the level of use relates to (b) how long the user stays in a corresponding chatroom, which may be calculated as a residence time from a time at which the user enters the chatroom to a time at which the user leaves the chatroom. Another example of the level of use relates to (c) how much or how often the user talks, which may be calculated as a ratio of conversation from the user in a corresponding chatroom to the entire conversation from the user in the entire chatrooms of the messenger or based on a ratio of conversation from the user to the entire conversation of the corresponding chatroom. As another example of the level of use relates to (d) how often the user starts a conversation, which may be calculated as a number of times the user starts a conversation after a desired (or alternatively, preset) period of time elapses after a last conversation. As another example of the level of use relates to (e) how often the user is mentioned in a corresponding chatroom, which may be calculated as a number of mentions in which a term (e.g., a name and a nickname) indicating the user appears in the chatroom. Further, how equally conversation is exchanged between the user and a counterpart, how much multimedia content, such as stickers, photos, and videos, are used, how long conversation is conducted without being interruption may be applied as factors to verify the level of use of the corresponding chatroom. The level of use of the chatroom may be verified based on at least one factor among the aforementioned factors or a combination of at least two factors thereof. In some example embodiments, a different weight may be assigned to a factor used to verify the level of use. For example, if a weight of 1 applies to the number of entrances into the chatroom or a ratio of conversation, a weight of 10 may apply to a conversation start count or a number of mentions. Therefore, the level-of-use verifier 310 may calculate a probability value representing a level of use of the user for each chatroom based on the aforementioned factors.

Referring again to FIG. 4, in operation S430, the chatroom selector 320 may select one or more chatrooms from among the entire chatrooms on the messenger as a chatroom or chatrooms that is unfrequently used and thus is to be specially managed, based on the level of use for each chatroom. The chatroom selector 320 may determine whether a corresponding chatroom is frequently used based on the level of use of the corresponding chatroom for each chatroom. For example, the chatroom selector 320 may select a chatroom of which the level of use is less than or equal to a desired level as the chatroom to be managed. As another example, the chatroom selector 320 may determine a ranking of each chatroom based on the level of use and then may select a chatroom of a predetermined (or alternatively, desired) ranking or less or a predetermined (or alternatively, desired) number of chatrooms from the lowest rank as the chatroom to be managed. As another example, the chatroom selector 320 may assign a rating to each chatroom based on the level of use and may select a chatroom to which a predetermined (or alternatively, desired) rating is assigned or that is maintained in a state of the rating for a preset (or alternatively, desired) period (e.g., 1 month) as the chatroom to be managed. Here, a different criterion for selecting the chatroom to be managed may apply based on a messenger use time for each user. For example, a different criterion for selecting the chatroom to be managed may apply to a user that uses the messenger for one hour or more a day and for a user that uses the messenger for less than 30 minutes a day.

In operation S440, the chatroom processing 330 may process the chatroom that is determined to be unfrequently used (e.g., the chatroom to be managed in the chatroom list of the messenger) to be distinguished from remaining chatrooms (hereinafter, referred to a general chatroom) based on a preset (or alternatively, desired) method. For example, the chatroom processing 330 may process a notification interval of a corresponding chatroom to be managed to be longer than that of a general chatroom (a notification interval processing scheme). For example, a notification associated with the general chatroom may be processed in real time and a notification associated with the chatroom to be managed may be processed based on a preset (or alternatively, desired) time unit, for example, every 3 hours. If a corresponding chatroom is determined as the chatroom to be managed consecutively for a preset (or alternatively, desired) period or more after the notification interval is set to the preset (or alternatively, desired) time unit (e.g., following a previous notification interval), the notification interval may be processed to be gradually extended. As another example, the chatroom processing 330 may automatically inactivate (e.g., turn OFF) a notification function of the chatroom to be managed (a notification inactivation processing scheme). Inactivation of the notification function may include not outputting notification feedback such as sound, vibration, and/or popup, as well as not outputting a notification badge representing a number of unread messages on a chatroom-related interface. As another example, the chatroom processing 330 may process the chatroom to be managed to be automatically deleted or hidden from the chatroom list of the messenger (a list processing scheme). Deleting of a chatroom refers to a leave action of deleting all of conversation content and information of the chatroom and also deleting the chatroom from the chatroom list, and hiding of the chatroom refers to a hiding action of deleting the chatroom from the chatroom list in a state in which the conversation content and information of the chatroom remain. In the case of processing the chatroom to be managed to be deleted or hidden, a corresponding notification is not forwarded to a counterpart included in the corresponding chatroom. As another example, the chatroom processing 330 may group chatrooms to be managed in the chatroom list of the messenger and may process a list of the chatrooms to be managed as a separate list distinguished from a general chatroom (a grouping processing scheme). One of the aforementioned processing schemes may apply to the chatroom to be managed. In some example embodiments, at least two of the aforementioned processing schemes may apply in stages. For example, the notification interval processing scheme may initially apply if a corresponding chatroom is initially determined as a chatroom to be managed and then the notification inactivation processing scheme or the list processing scheme may apply if the corresponding chatroom is consecutively determined as the chatroom to be managed in a subsequent interval. A scheme of processing the chatroom to be managed may be preset through system settings or may be directly set by the user of the electronic device 110.

Further, in response to all of the chatrooms included in the chatroom list of the messenger being determined as the chatroom to be managed, the chatroom processing 330 may process an account of the user registered to the messenger to be locked through interaction with the server 150. Here, if the entire chatrooms are maintained in a state of being selected as the chatroom to be managed during the preset (or alternatively, desired) period, the chatroom processing 330 may process account locking. In a state in which the messenger account is locked, the chatroom processing 330 may request re-authentication for the messenger account of the user in response to the user's access to another service (e.g., a financial support service or a social service) linked to the messenger and may unlock the locked messenger account through the re-authentication.

Figure 6:
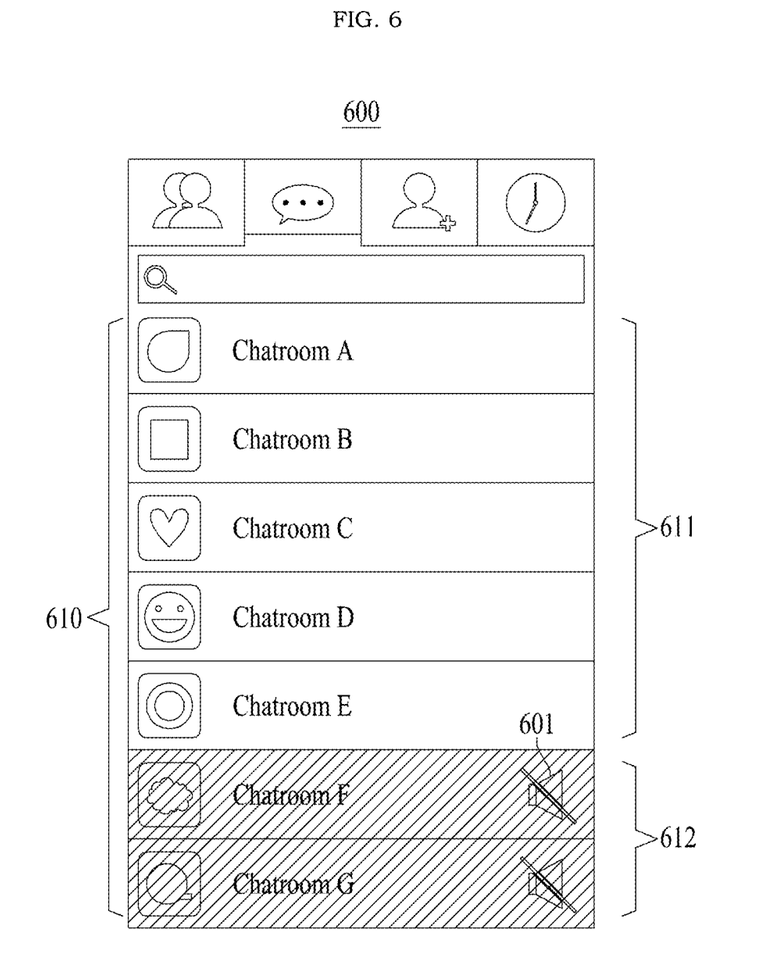
FIGS. 6 to 9 illustrate examples of a chatroom list screen according to some example embodiments.

FIG. 6 illustrates a chatroom list screen 600 of a messenger. Referring to FIG. 6, a chatroom list screen 600 may include a chatroom list 610 that includes chatrooms in which the user exchanges messages with other users. For example, the chatrooms included in the chatroom list 610 may be sorted in descending order based on a message sent/received time that is one of existing sorting criteria. That is, a chatroom may be provided in a relatively upper layer of the chatroom list 610 if a time at which a corresponding message is sent from or received by the user is relatively more recent.

Referring to FIG. 6, with the assumption that chatrooms F and G are selected as chatrooms to be managed 612 among chatrooms A, B, C, D, E, F, and G based on a level of use, the chatroom processing 330 may display a display factor (e.g., a template color, a font color, and a font size of a list) of the chatrooms to be managed 612 to be distinguished from remaining general chatrooms 611 in the chatroom list 610. If a notification inactivation processing scheme is applied to the chatrooms to be managed 612, an icon 601 representing a notification function OFF state may be displayed on each of the chatrooms F and G corresponding to the chatrooms to be managed 612.

Figure 7:
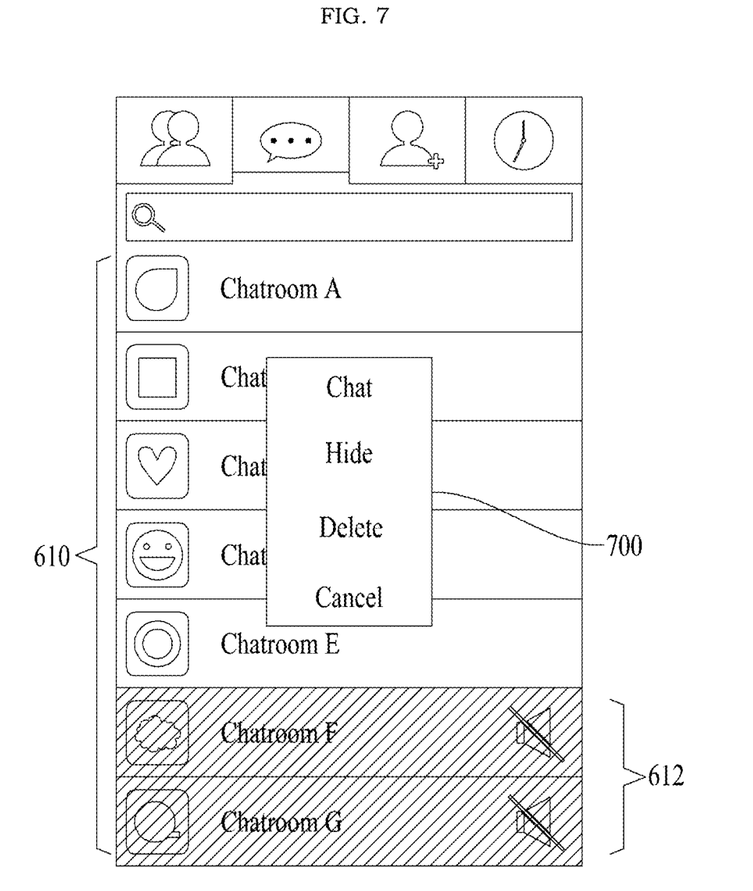

Referring to FIG. 7, the chatroom processing 330 may display a menu list 700 that includes a "Chat" menu for a conversation with a user included in a corresponding chatroom, a "Hide" menu for hidden processing in the chatroom list 610, a "Delete" menu for delete processing in the chatroom list 610, and a "Cancel" menu for cancelling a selection as a target to be managed with respect to the chatrooms to be managed 612. The user may verify the chatrooms to be managed 612 that are displayed to be different from the general chatrooms 611 in the chatroom list 610 and may manage the chatrooms to be managed 612 using the menu list 700, such as Chat, Hide, Delete, and Cancel.

Figure 8:
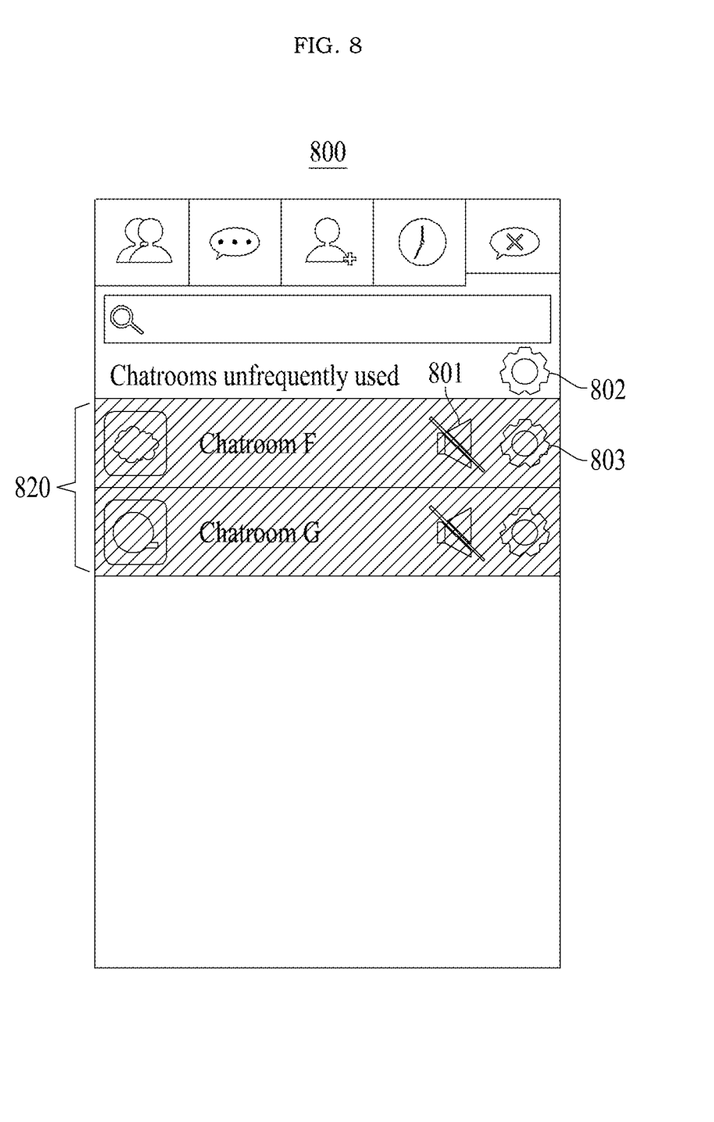

FIG. 8 illustrates another example of managing a chatroom to be managed and illustrates a screen 800 for displaying chatrooms to be managed as a separate list. Referring to FIG. 8, the screen 800 may include a chatroom list 820 in which chatrooms selected as chatrooms to be managed are sorted. Here, the chatrooms included in the chatroom list 820 may be sorted in order in which a corresponding chatroom is selected as a chatroom to be managed or based on a name of the corresponding chatroom.

If a notification inactivation processing scheme is applied to the chatrooms to be managed, an icon 801 representing a notification function OFF state may be displayed on each of the chatrooms F and G included in the chatroom list 820.

Further, the screen 800 may include a setting menu such that the user may directly set a scheme for processing the chatroom to be managed. Here, the setting menu may include an entire setting menu 802 for collectively setting the entire chatrooms to be managed included in the chatroom list 820 and an individual setting menu 803 for setting each chatroom to be managed.

Figure 9:
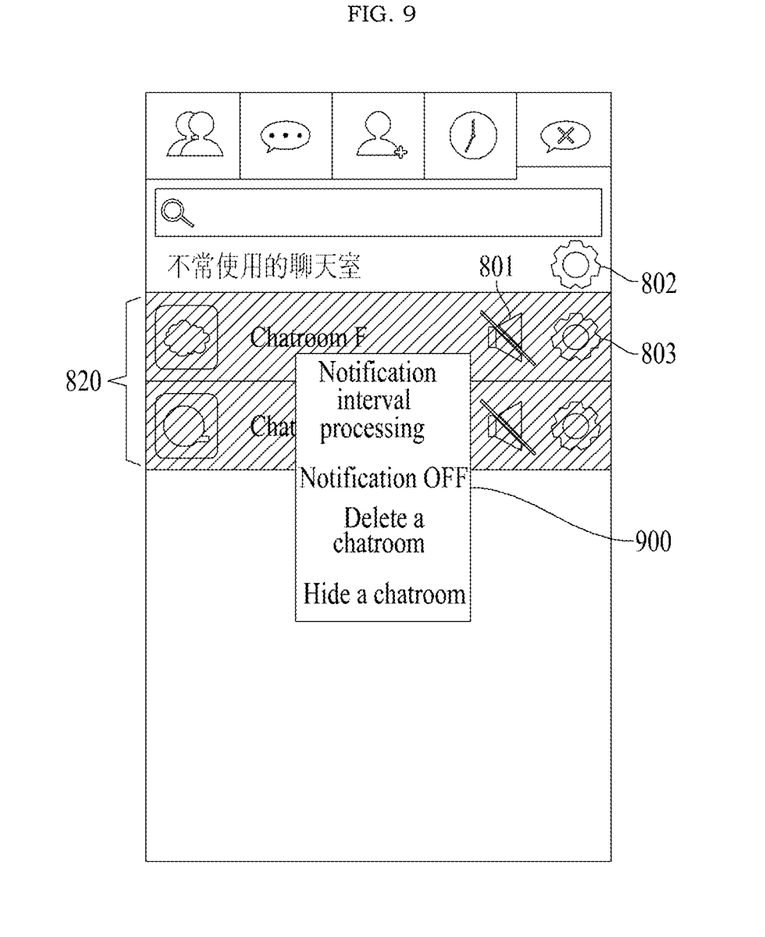

Referring to FIG. 9, in response to a selection on the entire setting menu 802 or the individual setting menu 803 on the screen 800, the chatroom processing 330 may display a setting screen 900 for setting a scheme for processing a chatroom to be managed. The setting screen 900 refers to a menu screen for selecting one of processing schemes applicable to the chatroom to be managed, and may include, for example, a "Notification interval processing" menu for applying a notification interval processing scheme to the chatroom to be managed, a "Notification OFF" menu for applying a notification inactivation processing scheme, a "Delete a chatroom" menu for applying a processing scheme of deleting a chatroom from a list, and a "Hide a chatroom" menu for applying a scheme of hiding a chatroom in the list.

Likewise, the chatroom list screen 600 of FIG. 6 may include a setting menu that allows the user to directly set a scheme for processing the chatrooms to be managed 612 in the chatroom list 610.

Although it is described that the electronic device 110 performs the chatroom processing method in response to an instruction provided from an application installed on the electronic device 110, it is provided as an example only. Depending on some example embodiments, the server 150 may directly perform the chatroom processing method through interaction with the application installed on the electronic device 110.

For example, to perform all of or a portion of the chatroom processing method of FIG. 4, the processor 222 of the server 150 may include a level-of-use verifier, a chatroom selector, and a chatroom processing. Depending on some example embodiments, the components of the processor 222 may be selectively included in or excluded from the processor 222. Further, depending on some example embodiments, the components of the processor 222 may be separated or merged for functional representation of the processor 222.

The processor 222 and the components of the processor 222 may control the server 150 to perform operations S420 to S440 of FIG. 4. For example, the processor 222 and the components of the processor 222 may be configured to execute an instruction according to a code of an OS and a code of at least one program included in the memory 221.

The level-of-use verifier, the chatroom selector, and the chatroom processing included in the processor 222 of the server 150 may perform operations S420 to S440 in a manner identical or corresponding to the level-of-use verifier 310, the chatroom selector 320, and the chatroom processing 330 of FIG. 3. Therefore, further description related to the components of the processor 222 is omitted.

According to some example embodiments, by determining a level of use for each chatroom and by extending a notification interval or inactivating (e.g., turning OFF a notification) for a chatroom unfrequently used by a user, a server may save resources and cost for a push notification and the user may reduce an undesired chatroom notification and focus on a chatroom of interest frequently used.

The systems or apparatuses described above may be implemented using hardware components or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer, or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), or flash memory. Examples of other media may include recording media and storage media managed at an app store that distributes applications or sites and servers that supply and distribute various types of software. Examples of program instructions include both machine code, such as produced by a compiler, and files containing higher-level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A chatroom processing method implemented by a computer system comprising at least one processor configured to execute computer-readable instructions included in a memory, the method comprising:
   verifying, by the at least one processor, a level of use by a user of the computer system with respect to each chatroom of chatrooms included in a chatroom list;

selecting, by the at least one processor, at least one chatroom from the chatroom list as a chatroom to be managed based on the verified level of use; and processing, by the at least one processor, the chatroom to be managed to be distinguished from remaining chatrooms in the chatroom list, wherein the verifying comprises verifying the level of use by verifying a use pattern according to a participation of the user into a conversation for each of the chatrooms and by converting a usage of a corresponding chatroom by the user to a score based on the use pattern, and wherein the selecting comprises selecting the at least one chatroom of which the level of use is less than or equal to a desired level as the chatroom to be managed.

2. The chatroom processing method of claim 1, wherein the verifying comprises verifying the level of use by calculating at least one factor from among a number of entrances, a residence time, a conversation ratio, a conversation start count, or a number of mentions in association with the user for each chatroom.

3. The chatroom processing method of claim 1, wherein the selecting comprises:
determining a ranking of each chatroom based on the level of use; and
selecting the at least one chatroom of a desired ranking or less or the at least one chatroom, which includes a desired number of chatrooms from the lowest, as the chatroom to be managed.

4. The chatroom processing method of claim 1, wherein the selecting comprises:
assigning a rating to each chatroom based on the level of use; and
selecting the at least one chatroom to which a desired rating or less is assigned as the chatroom to be managed.

5. The chatroom processing method of claim 1, further comprising:
determining a criterion for selecting the at least one chatroom as the chatroom to be managed differently based on a messenger use time for the user.

6. The chatroom processing method of claim 1, wherein the processing comprises processing a notification interval of the chatroom to be managed to be longer than those of the remaining chatrooms.

7. The chatroom processing method of claim 1, wherein the processing comprises inactivating a notification function of the chatroom to be managed.

8. The chatroom processing method of claim 1, wherein the processing comprises processing the chatroom to be managed to be deleted or hidden from the chatroom list.

9. The chatroom processing method of claim 1, wherein the processing comprises processing an account of the user associated with the chatroom list to be locked, in response to the selecting an entirety of the chatrooms included in the chatroom list, as the chatroom to be managed.

10. A non-transitory computer-readable record medium storing instructions thereon, which when executed by at least one processor, cause a computer system to implement the chatroom processing method of claim 1.

11. A computer system comprising:
a memory; and
at least one processor configured to connect to the memory and to execute computer-readable instructions included in the memory such that the at least one processor is configured to,
verify a level of use by a user of the computer system with respect to each chatroom of chatrooms included in a chatroom list;
select at least one chatroom from the chatroom list as a chatroom to be managed based on the verified level of use; and
process the chatroom to be managed to be distinguished from remaining chatrooms in the chatroom list,
wherein the at least one processor is further configured to verify the level of use by verifying a use pattern according to a participation of the user into a conversation for each of the chatrooms and by converting a usage of a corresponding chatroom by the user to a score based on the use pattern, and
wherein the at least one processor is further configured to select the at least one chatroom of which the level of use is less than or equal to a desired level as the chatroom to be managed.

12. The computer system of claim 11, wherein the at least one processor is further configured to verify the level of use by calculating at least one factor from among a number of entrances, a residence time, a conversation ratio, a conversation start count, or a number of mentions in association with the user for each chatroom.

13. The computer system of claim 11, wherein the at least one processor is further configured to,
determine a ranking of each chatroom based on the level of use, and
select the at least one chatroom of a desired ranking or less or the at least one chatroom, which includes a desired number of chatrooms from the lowest, as the chatroom to be managed.

14. The computer system of claim 11, wherein the at least one processor is further configured to process a notification interval of the chatroom to be managed to be longer than those of the remaining chatrooms or to inactivate a notification function of the chatroom to be managed.

15. The computer system of claim 11, wherein the at least one processor is further configured to process the chatroom to be managed to be deleted or hidden from the chatroom list.

16. The computer system of claim 11, wherein the at least one processor is further configured to process an account of the user associated with the chatroom list to be locked, in response to a selection of an entirety of the chatrooms included in the chatroom list, as the chatroom to be managed.

* * * * *